United States Patent [19]

Talbott

[11] Patent Number: 4,495,725
[45] Date of Patent: Jan. 29, 1985

[54] SEED GERMINATING APPARATUS AND METHOD

[76] Inventor: Gene B. Talbott, Rte. 2, Box 200, Banks, Oreg. 97106

[21] Appl. No.: 588,560

[22] Filed: Mar. 12, 1984

[51] Int. Cl.³ .............................................. A01G 9/82
[52] U.S. Cl. .......................................... 47/85; 47/86
[58] Field of Search ................................ 47/85, 86, 87

[56] References Cited

U.S. PATENT DOCUMENTS 3,142,133  7/1964  Brooks ..................................... 47/86
4,242,834  1/1981  Olsen ....................................... 47/85

*Primary Examiner*—Robert A. Hafer
*Assistant Examiner*—Bradley M. Lewis
*Attorney, Agent, or Firm*—Kolisch, Hartwell, Dickinson & Anderson

[57] ABSTRACT

An apparatus is provided for growing plants having a floor with a plurality of raised projections defining trough regions therebetween and being adapted to hold plant watering fluid at a level relative to the upper periphery of the projections. An insert for the pan is also provided, having a plurality of spaced, downwardly extending cells, each cell including a bottom defining an opening. The insert is shiftable between a first position and a second position. The first position is one in which the bottoms are disposed in the trough regions below the level of the watering fluid so that the fluid can enter the openings. In the second position, at least some of the bottoms rest upon the projections so that the openings are less than fully obstructed by the projections and so that fluid within the cells can drain therefrom. Another aspect of the invention is a method for germinating plant seeds. The method includes the steps of adding, to a pan having a plurality of raised, parallel projections, watering fluid to a level below the upper periphery of the projections, a seed in each of a plurality of downwardly extending, aligned, humus-bearing cells of an insert having an opening in the bottom of each cell. The insert is initially disposed in a first position in which the bottoms are between the projections below the level of the fluid so that the fluid can enter the cell openings. The insert is then shifted to a second, raised position in which the bottoms rest upon the raised projections such that the openings are less than fully obstructed by the projections and so that excess fluid within the cells can drain therefrom. The insert is repeatedly shifted between the first and second positions as need to moisten the seed.

8 Claims, 4 Drawing Figures

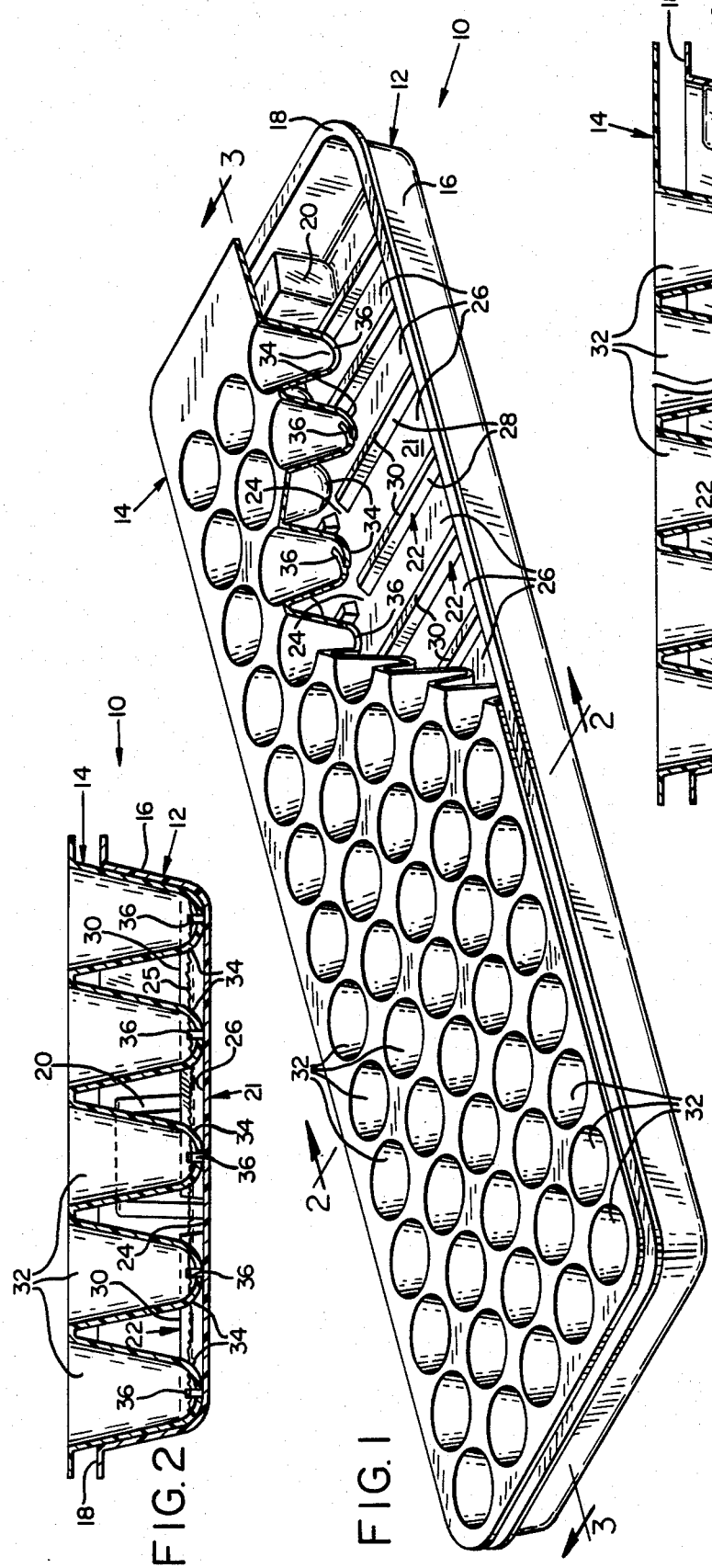

SEED GERMINATING APPARATUS AND METHOD

BACKGROUND OF THE INVENTION

This invention relates generally to an apparatus and method for growing plants and more particularly to an apparatus having a plurality of seed germinating cells positionable within a water-filled pan.

It is desirable with many plants, such as flowers and crops, that the plant seed be germinated under very favorable, controlled conditions which typically exist only indoors. To facilitate the germination of a relatively large number of plants, various tray-type apparatuses have been developed having a plurality of cells which provide an appropriate amount of dirt or other humus for the seed to germinate, to prevent the intergrowth of the roots from adjacent plants, and to generally promote an ordered germination pattern.

A number of prior art patents disclose various multicelled trays in which plant seeds are germinated for subsequent transplanting. Many such trays have openings in the bottom for the flow of excess water therefrom. Such designs are disclosed in U.S. Pat. Nos. 3,667,159 to Todd; 3,949,523 to Lehtipuu; 3,992,810 to Kimball; Des. 248,935 to Stutelberg et al.; Des. 259,868 to Julinot; and Des. 266,914 to Miller.

Another approach has been to have a pan which is adapted to be filled with watering fluid, into which a plurality of seed germinating cells may be placed. Such designs are disclosed in U.S. Pat. Nos. 4,291,494 to Knablein et al.; 3,751,852 to Schrepper; and Des. 218,629 to Hasselbach; and 1,623,720 to Ellis.

While the latter set of patents provides a ready supply of watering fluid to the germinating seeds, this is not provided without drawbacks. For example, if the water level is so high that water will always contact the bottom of the germinating cell, some roots will perpetually be immersed in water, possibly resulting in root rot. If, on the other hand, the level of water is approximately level with the bottom of the cells, roots within each cell will have a tendency to grow through the drainage holes and into the water, thereby resulting in complications when the germinated seeds have to be transplanted. If the water level is lower than the cell bottoms, the germinating seeds will not receive sufficient water unless they are manually watered from above, with the pan being used merely for collection of excess water. This is what is apparently intended to occur with the systems disclosed in the last-cited group of patents. These systems require manual watering of the seeds, not only resulting in time consuming maintenance, but also causing a substantial amount of the nutrients in the humus to drain away through the openings, thereby requiring regular fertilization to maintain nutrients in the humus.

U.S. Pat. No. 661,411 to Lonitz discloses a single, two-piece pot having a plurality of ribs and complimenting recesses which permit the upper portion of the pot to be sealed to the lower part of the pot when the ribs and recesses are aligned, but which also permits the upper part of the pot to be placed in a spaced relationship with respect to the lower pot by rotatably shifting the upper pot to a position in which the ribs and recesses are offset with respect to one another. This feature is provided to permit the lower portion of the upper pot to be aired out.

It is an object of the present invention to provide a seed germinating tray which overcomes the drawbacks and limitations of the prior art proposals. More specifically, the present invention has as its objects the following: (1) to provide a plant-growing apparatus which permits subirrigation, thereby reducing the amount of nutrients which are lost during the watering process; (2) to develop a seed-germinating apparatus which is usable by a novice and in which the degree of watering applied to the germinating seeds may be easily regulated; (3) the provision of a seed-germinating apparatus which ensures that the growth of the seed roots will be controlled within the germinating cell, that is, which results in air-pruning of the roots; (4) the development of a seed-germinating tray which is inexpensive and may be fabricated of light materials, but which is self-supporting and portable; (5) to develop a seed-germinating apparatus which may be long and narrow in construction so that it is usable on windowsills; and (6) to provide a seed-germinating apparatus to which water need not be added for long intervals.

SUMMARY OF THE INVENTION

The present invention achieves the above objects by providing an apparatus for growing plants and which is particularly adapted to germinate seeds for subsequent transplanting. The apparatus includes the following components: a pan having a floor with a plurality of raised projections defining trough regions therebetween and being adapted to hold plant watering fluid at a level below the upper periphery of the projections, and an insert for the pan having a plurality of spaced, downwardly extending cells, the position of which corresponds to the position of the projections, each cell including a bottom defining an opening. The insert is shiftable between a first position in which the bottoms are disposed in the trough regions below the level of the fluid so that the fluid can enter the openings, and a second position in which at least some of the bottoms rest upon the projections such that the openings are less than fully obstructed by the projections so that excess fluid within the cells can drain therefrom.

The projections normally take the form of spaced, parallel ribs defining troughs therebetween, with fluid conveying channel means extending from end to end of the pan for conveying fluid between the troughs. In this form of the invention, the cells are in spaced, parallel rows so that when the insert is in the first position, the bottoms of the rows of cells are disposed in the troughs, and when the insert is in the second position, the rows of cells rest on the ribs.

Another aspect of the invention is a method for germinating seeds. The first step of the method is to add, to a pan having a plurality of raised, parallel projections therein, watering fluid to a level just above the upper periphery of the projections. The next step is to deposit a seed in each of a plurality of a downwardly extending, aligned, humus-bearing cells of an insert having an opening in the bottom of each cell. The insert is initially disposed in a first position in which the bottoms are placed between the projections below the level of the fluid so that fluid can enter the cell openings. The insert is then shifted to a second, raised position in which the bottoms rest upon the projections such that the openings are less than fully obstructed by the projections and so that excess fluid within the cells can drain therefrom. The insert is repeatedly shifted between the first and second positions as needed to moisten the seeds.

These and other advantages and features of the present invention will become apparent when consideration is given to the following detailed description and the accompanying drawings.

BRIEF DESCRIPTION OF THE DRAWINGS

FIG. 1 is a partially broken-away, perspective view of a first embodiment of the present invention;

FIG. 2 is an end elevation, sectional view taken along line 2—2 of FIG. 1;

FIG. 3 is a fragmentary side elevation, sectional view taken along line 3—3 of FIG. 1, showing the insert in a first, lowered position; and FIG. 4 is a fragmentary, side elevation sectional view corresponding to FIG. 3 except that the insert is shown to be in a second, raised position.

DETAILED DESCRIPTION OF THE PREFERRED EMBODIMENT

Construction of the Depicted Embodiment

The objects of the present invention are particularly well-achieved when the invention takes the form of the seed-germinating tray depicted in FIGS. 1-4 and identified generally with the numeral 10. While tray 10 will be described in its normal usage, as a seed-germinating apparatus, it should be appreciated that, if sized properly with respect to the type of plant, the tray may be used throughout the life cycle of the plant. However, tray 10 is normally used to germinate seeds and grow seedling transplants. When the plants grow to a practical size for transplanting, they are removed from the tray and are transplanted directly into the ground, or into another suitable growing environment such as into a garden, etc.

Tray 10 consists essentially of a long, narrow, shallow pan 12 and a pan insert 14. Pan 12 includes sidewalls 16 which terminate in an outwardly directed flange 18. One of the end side walls includes an inwardly extending shoulder 20, the purpose of which will be discussed below.

The bottom or floor 21 of pan 12 includes a plurality of evenly spaced, parallel ribs 22 which extend from side to side of the pan. A so-called fluid conveying channel means in the form of a gap 24 in each of the ribs 22 extends from end to end of pan 12 so that watering fluid 25 which is placed in the bottom of the pan can flow from end to end of the pan without having to be sufficiently high to pass over ribs 22. Described another way, ribs 22 define a plurality of troughs 26 which are interconnected by gaps 24 in the ribs.

As shown best in FIGS. 3 and 4, the cross-sectional configuration of ribs 22 is normally frusto-triangular, that is, having upwardly and inwardly directed sides 28, with a squared-off, flat top 30. This configuration is particularly suitable to cooperate with the depicted configuration of insert 14, but it should be appreciated that the ribs may take other forms as well. In fact, the function of ribs 22 may be fulfilled by upwardly projecting portions having any number of other configurations, as long as they are aligned with respect to the downwardly extending cells of insert 14, to be described below. The ribbed configuration is particularly advantageous, however, because it is inexpensive to fabricate and adds to the strength of pan 12.

The peripheral dimensions of insert 14 correspond generally to those of pan 12 so that the insert fits into the pan. Insert 14 includes a plurality of aligned, downwardly extending seed-germinating cells 32. Each cell 32 is generally frusto-conical in configuration, except that their bottoms 34 are typically rounded off. A slot 36 is defined in each of the cells, the slots being generally aligned in the depicted embodiment along a linear axis from end to end of tray 10. While this precise slot configuration or alignment is not critical, in order to facilitate air-pruning, it is important that the configuration of the slots not be such that they will be totally obstructed by the tops 30 of ribs 22 when the cell bottoms 34 are disposed on top of the ribs as shown in FIG. 4. The configuration of cells 32 similarly need not be exactly that which is depicted, nor is it necessary for the cells to be arranged in the depicted manner, but it is necessary that the spacing and arrangement of the cells corresponds generally to that of ribs 22 or other upwardly projecting portions of the pan, for reasons which will become evident as this description continues.

The pan 12 and insert 14 of tray 10 are typically stamped of lightweight plastic. Nonetheless, the rib 22, side wall 16 and flange 18 configuration of pan 12 is such that sufficient structural strength is assured.

Operation of the Depicted Embodiment

Cells 32 of insert 14 should first be substantially filled with dirt or humus (not shown) and one or more seeds (also not shown) should be placed in each of the cells. Before placing insert 14 in pan 12, a predetermined amount of watering fluid 25 is added to the pan. Watering fluid 25 is typically pure water, but various nutrients may be added to it, and this composite fluid is intended to be covered by the term "watering fluid." Watering fluid 25 is added until the level of the fluid is slightly above the tops 30 of each of the ribs 22. Assuming the pan is level, the level of the watering fluid 25 within pan 12 will be evenly distributed throughout the pan as a result of the gaps 24 in the ribs 22, which permit the level of the watering fluid to flow between the troughs 26.

Once watering fluid 38 has been added to pan 12, insert 14 may be placed into the pan. Insert 14 may be disposed in a first lowered position, depicted in FIG. 3, or a second, raised position depicted in FIG. 4. The first position is one in which the bottoms 34 of each of the cells 32 is disposed against the floor 23 within each of the troughs 26. In this first position, watering fluid 38 is permitted to subirrigate cells 32 by flowing upwardly through the slot 36 in each of the cells. Absorption of the watering fluid into the cells will result in the water level dropping below the tops 30 of the ribs 22. If the water level does not drop below the ribs, then the tray may be tipped and surplus watering fluid can be drained out. When a sufficient time has elapsed, which time may be predetermined but is not normally critical, insert 14 is shifted to its second position. To shift insert 14 to this second or raised position, the insert is shifted rightwardly as depicted in FIG. 3 until the endmost cell abuts shoulder 20, as shown in FIG. 4. Thus, the shifting of the insert 14 to this second position is easy and may be done with no skill. In this position, the bottoms 34 of each of the cells 32 are disposed on the tops 30 of each of the ribs 22.

With the level of watering fluid 38 being below that of the tops 30 of ribs 22, excess fluid is permitted to flow through slots 36 and back into pan 12. This prevents overwatering of the seeds and the accompanying problems of root rot once the seeds have germinated. Also, because an air gap exists between the humus and watering fluid 25, the roots of the germinating seed will not grow through the slots 36 and into the watering fluid, as would happen with some of the prior art designs. Thus, the tray 10 may be described as being self- or air-pruning. This is an important feature because if roots are permitted to grow through the slots, removal of the germinated seed during transplantation will cause damage to the root structure. Air-pruning also stimulates growth of the roots in the cell, and the tap roots fill up the cells with buds. This results in a cohesive plug for transplanting.

As shown in FIG. 2, shoulder 20 normally abuts only the center end-most cell, but it may alternatively extend across the entire endmost sidewall. An alternative configuration would include an end sidewall which is closer to the endmost rib so that when the insert is pulled to this second, raised position, all of the endmost cells abut the end sidewall.

Other changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

It is claimed and desired to be secured by Letters Patent:

1. Apparatus for growing plants, comprising:
   a pan having a floor with a plurality of raised projections defining trough regions therebetween and being adapted to hold plant watering fluid at a predetermined level relative to the upper periphery of said projections; and
   an insert for the pan having a plurality of spaced, downwardly extending cells, the position of which corresponds to the position of said projections, each said cell including a bottom defining an opening, said insert being shiftable between a first position in which said bottoms are disposed in said trough regions below the level of the fluid so that the fluid can enter the openings, and a second position in which at least some of said bottoms rest upon said projections such that said openings are less than fully obstructed by said projections so that excess fluid within said cells can drain therefrom.

2. The apparatus of claim 1 wherein said projections comprise spaced, parallel ribs defining a plurality of troughs therebetween, and further comprising fluid conveying channel means for conveying fluid between said troughs.

3. The apparatus of claim 2 wherein said cells are aligned in spaced, parallel rows, the spacing of which corresponds to the spacing of said ribs so that when said insert is in said first position, said cell bottoms are disposed in said troughs, and when said insert is in said second position, said cell bottoms rest on said ribs.

4. The apparatus of claim 3 wherein said openings comprise slots having a longer dimension angularly disposed with respect to said ribs.

5. The apparatus of claim 3 wherein said pan includes sidewalls having abutment means against which at least one of said cells is in abutment when said insert is in said second position.

6. The apparatus of claim 5 wherein said abutment means comprises a raised shoulder in one of said sidewalls, against which at least one of said cells of the end-most row of said cells is in abutment when said insert is in said second position.

7. The apparatus of claim 3 wherein said fluid conveying channel means comprises a gap defined in each of said ribs to permit fluid to flow between said troughs.

8. A method for germinating plant seeds, comprising:
   adding, to a pan having a plurality of raised, parallel projections therein, watering fluid to a predetermined level relative to the upper periphery of the projections;
   depositing a seed in each of a plurality of downwardly extending, aligned, humus-bearing cells of an insert having an opening in the bottom of each cell, the insert being disposed in a first position in which the bottoms are placed between the projections below the level of the fluid so that the fluid can enter the cell openings;
   shifting the insert to a second, raised position in which the bottoms rest upon the projections such that the openings are less than fully obstructed by said projections and so that excess fluid within the cells can drain therefrom; and
   repeatedly shifting the insert between the first and second positions as needed to moisten the humus.

* * * * *